May 28, 1940.  C. G. WOOD  2,202,132

CLUTCH PLATE CONSTRUCTION

Filed March 15, 1938

INVENTOR.
Clarence G. Wood
BY
Fay, Oberlin & Fay
ATTORNEYS.

Patented May 28, 1940

2,202,132

UNITED STATES PATENT OFFICE 2,202,132

CLUTCH PLATE CONSTRUCTION

Clarence G. Wood, Cleveland, Ohio

Application March 15, 1938, Serial No. 196,029

10 Claims. (Cl. 192—68)

This invention relates to a clutch assembly, and more particularly to an assembly adapted for automotive use in which the clutch members are automatically re-engaged when the clutch disengaging means is released.

The principal purpose of the invention is the provision of a simple clutch including a resilient spring member normally bearing against the clutch parts and adapted to be flexed when the clutch is disengaged. The flexing of the resilient member acts to re-engage the clutch plates when the disengaging means is released.

The use of such members is broadly old and the novelty in my invention chiefly resides in the type of resilient spring member used and the manner in which it cooperates to complete the clutch combination.

I have found that a spring of a cross-sectional shape, which I describe as double conical and which bears at each side against the parts which are movable with respect to each other, results in a clutch mechanism which is both simple and positive. In my preferred form such a spring comprises two frusto-conical sections formed as an integral unit such that the base circle of one part joins the apex circle of the other part to form a ring of V-shaped cross-section as hereafter shown and described.

To the accomplishment of the foregoing and related ends, said invention, then, consists of the means hereinafter fully described and particularly pointed out in the claims; the annexed drawing and the following description setting forth in detail certain structure embodying the invention, such disclosed means constituting, however, but one of various means in which the principle of the invention may be used.

Figure 1:
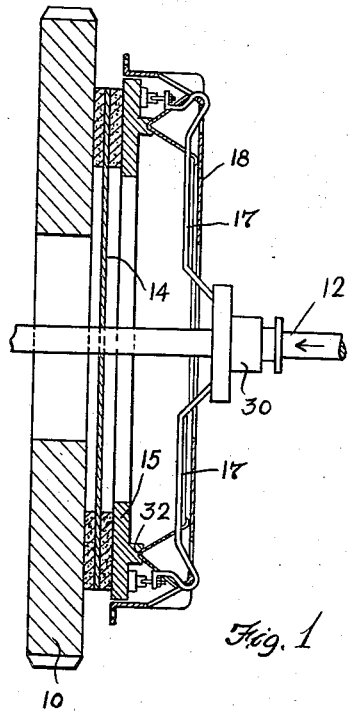
Fig. 1 is a transverse section through my improved clutch assembly.

Referring now to Fig. 1, the assembly comprises a conventional flywheel 10 and a driven shaft 12 adapted to be connected therewith by a clutch plate 14 slidable axially parallel to the shaft. In normal operation the shaft and flywheel are connected to drive as a unit and transmit the power of the prime mover to the desired point of delivery. The clutch is adapted to be disconnected or thrown out to break the drive, and mechanism is provided to automatically re-establish the drive when the throw-out means is released.

The clutch assembly is encased by a circular cover 18 which is rotatable with the flywheel and may be rigidly secured thereto although I have not so illustrated it. This cover is dish-shaped and concentric on its circular axis with the axis of the shaft 12. The flat portion of the cover, which extends radially, is centrally pierced to accommodate the shaft. As hereinafter described, the spring mechanism bears on the said flat portion.

Figure 2:
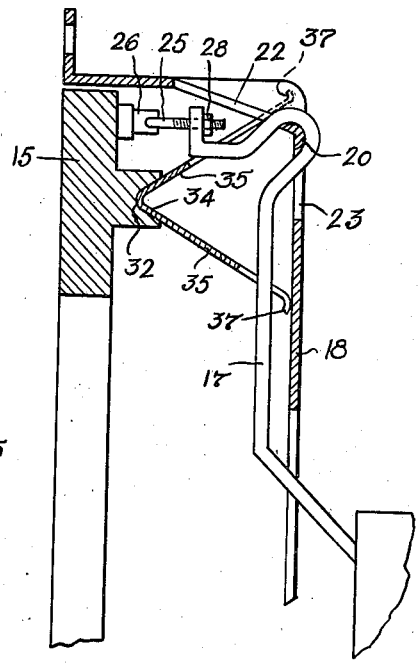
Fig. 2 is an enlarged fragmentary section in a plane identical with Fig. 1.

The clutch is engaged by forcing the surfaces into engagement by pressure exerted through a pressure plate 15. This plate is mounted for normally maintaining the clutch in an engaged position and is shifted axially of the shaft to disengage the same. Such shifting is accomplished by the shift rods 17 shaped as shown in Figs. 1 and 2 and pivotally carried by the clutch cover 18 as indicated at 20. The pivotal supports 20 are formed by rounding a portion of the cover set out by forming slots 22 and 23 on each side thereof to permit looping the rod 17 thereover.

The outer ends of the rods are secured to the pressure plate 15 by threaded members 25 pivotally carried in lugs 26 of the plate. The rods and members are adjustable with respect to each other through rotation of nuts 28 to control the amount of movement necessary to shift the pressure plate and to insure that the levers are in the same plane, since unequal lever positions constitute one principal cause of trouble in present clutches.

A shift collar 30 is provided, slidable axially of the shaft 12 and bearing against the inner ends of the rods 17. In automotive use, as the clutch pedal is depressed the collar 30 is shifted to the left (Fig. 1) rocking the rods 17 about pivot points 20 and pulling the pressure plate away from the clutch surfaces to permit the same to disengage themselves.

Mechanism is provided to effect a reengagement of the clutch by movement of the pressure plate to engaged position when the foot pedal pressure on the collar 30 is released and the same is free to return to its axial position. Such reengagement is controlled by spring means which become flexed out of normal position when the pressure plate is withdrawn and, through such flexing, restore the pressure plate to position when the foot pedal and collar controlled thereby are released.

Figure 3:
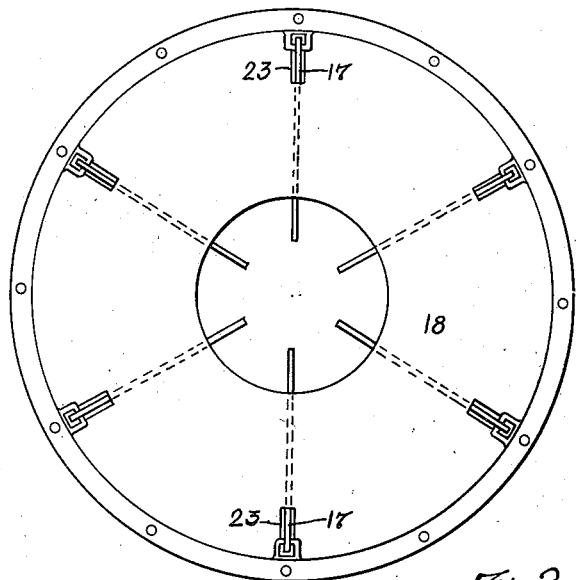
Fig. 3 is a plan view looking toward the left in Fig. 1.
Figure 4:
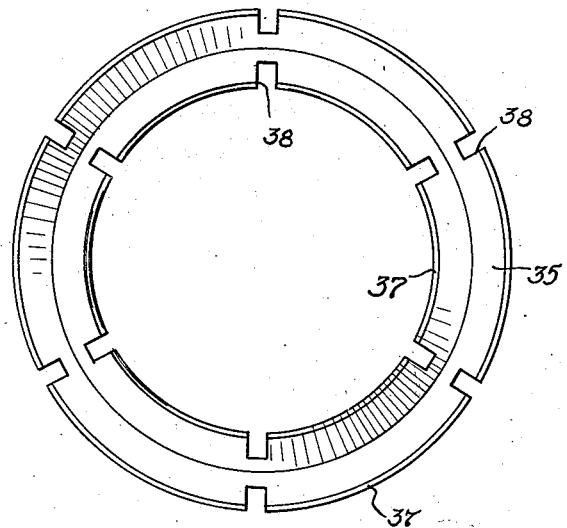
Fig. 4 is a plan view of the double conical spring member utilized to engage the clutch.

The spring means just mentioned is the double conical spring above discussed and designated generally at 35. In its preferred form it is shaped as indicated in Figs. 2 and 3 to provide a double conical ring shaped of sheet material. The two sides, or frusto-conical portions, being joined at the apex, are formed to flex apart as the plate is withdrawn.

The apex 34 of this resilient spring member nests within the V-slot 32 in the pressure plate and bears at its edge portions against the cover to provide the clutch re-engaging action. The free ends of the member are curled or beaded, as at 37, to permit the spring to slide freely over the clutch cover. Slots 38 permit free movement of the rods 17 without interference from the spring.

The clutch is engaged in the position shown in Figs. 1 and 2, due to the spring action exerted by the two faces of the V-spring tending to move toward each other. As the clutch is disengaged, on the other hand, by movement of the pressure plate to the right, Fig. 2, the sides of the V forming the spring member 35, are shifted apart, sliding along beads 37 on the clutch cover. It is this flexing of the spring member which reengages the clutch plate when the pedal pressure is released.

Delayed engagement is obtained due to resistance of the spring member bearing against the cover, preventing instant engagement with the drive plate.

This prolonging of engaging period brings car speed up to motor speed gradually and, therefore, any excessive movement of the motor due to being flexibly mounted, or due to unequal cylinder pressure, is absorbed in the slipping of the drive plate and is not transmitted directly to the rear wheels as is now the case and is the cause of so-called clutch chatter now prevalent throughout the industry, and one of the principal causes for complaint by the motor car-driving public.

From the foregoing description it will be apparent that I have provided a novel clutch construction in which the friction surfaces are automatically re-engaged when the force tending to disengagement is released.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a clutch assembly, a cover, a shaft, a pressure plate shiftable to engage and disengage the clutch, means to shift said pressure plate and disengage said clutch, and other means including an annular sheet spring member of V-shaped cross-section interposed between said cover and said pressure plate to re-engage the clutch surfaces when said clutch disengaging means is released.

2. In a clutch assembly, a cover, a shaft, a pressure plate shiftable to engage and disengage the clutch, means to shift said pressure plate and disengage said clutch, and other means including an annular sheet spring member of V-shape cross-section interposed between said cover and said pressure plate and in slidable engagement with said cover to re-engage the clutch surfaces when said clutch disengaging means is released.

3. In a clutch assembly, a cover, a drive-establishing plate shiftable with respect to said cover and a double-conical spring member interposed between said cover and said plate and adapted to be flexed to shift said cover and said plate with respect to each other.

4. In a clutch assembly, a cover, a shaft, a pressure plate shiftable axially of said shaft to engage and disengage the clutch, means to shift said pressure plate and disengage said clutch, and a sheet spring member of V-shape cross-section interposed between said cover and said pressure plate to re-engage the clutch surfaces when said clutch disengaging means is released.

5. In a clutch assembly, a cover, a shaft, a pressure plate shiftable axially of said shaft to permit engagement and disengagement of the clutch surfaces, means to shift said pressure plate and disengage said clutch, and an annular sheet spring member of double-conical cross-section and interposed between said cover and said pressure plate to re-engage the clutch surfaces when said clutch disengaging means is released.

6. In a clutch assembly, a cover, a shaft, a pressure plate shiftable axially of said shaft to permit engagement and disengagement of the clutch surfaces, means to shift said pressure plate and disengage said clutch, an annular sheet spring member of V-shaped cross-section and bearing at the apex of the V against the pressure plate and at the edges of the V against the said cover to re-engage the clutch surfaces when said clutch disengaging means is released.

7. In a clutch assembly, a cover, a pressure plate, a plurality of arms pivotally carried by said cover and connected to said pressure plate, a shaft, a collar slidable on said shaft to shift said arms and withdraw said pressure plate to disengage the clutch, a ring-shaped spring member of V-cross-section interposed between said cover and said pressure plate with the sides of said V tending to move toward each other to re-engage said clutch when said collar is released.

8. In a clutch assembly, a cover, a shaft, a pressure plate shiftable to engage and disengage the clutch, means to shift said pressure plate and disengage said clutch, and means interposed between said cover and said pressure plate to re-engage the clutch surfaces when said clutch disengaging means is released, said last-named means comprising an annular member having a V-shaped cross-section in a plane parallel with the axis of said shaft.

9. In a clutch assembly, a cover, a shaft, a pressure plate shiftable to engage and disengage the clutch, means to shift said pressure plate and disengage said clutch, and means interposed between said cover and said pressure plate to re-engage the clutch surfaces when said clutch disengaging means is released, said last-named means comprising an annular member having a V-shaped cross-section in a plane parallel with the axis of said shaft, the apex of said member bearing against said pressure plate and the legs thereof against said cover.

10. In a clutch plate assembly, a cover, a shaft, a pressure plate shiftable to engage and disengage the clutch, means to shift said pressure plate and disengage said clutch, and means interposed between said cover and said pressure plate to re-engage the clutch surfaces when said clutch disengaging means is released, said last-named means comprising an annular member formed of integrally joined frusto-conical sheets.

CLARENCE G. WOOD.